(12) United States Patent
Garlapati et al.

(10) Patent No.: US 11,200,380 B2
(45) Date of Patent: Dec. 14, 2021

(54) SENTIMENT TOPIC MODEL

(71) Applicant: Walmart Apollo, LLC, Bentonville, AR (US)

(72) Inventors: Mani Kanteswara Garlapati, Bangalore (IN); Lakshmi Kommuru, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 164 days.

(21) Appl. No.: 16/445,063

(22) Filed: Jun. 18, 2019

(65) Prior Publication Data
US 2020/0356633 A1 Nov. 12, 2020

(30) Foreign Application Priority Data
May 7, 2019 (IN) .............................. 201941018222

(51) Int. Cl.
| | |
|---|---|
| *G06F 3/048* | (2013.01) |
| *G06F 40/30* | (2020.01) |
| *G06Q 30/02* | (2012.01) |
| *G06F 16/28* | (2019.01) |
| *G06F 3/0484* | (2013.01) |

(52) U.S. Cl.
CPC ............ *G06F 40/30* (2020.01); *G06F 16/287* (2019.01); *G06Q 30/0282* (2013.01); *G06F 3/0484* (2013.01)

(58) Field of Classification Search
CPC ........ G06F 40/30; G06F 16/287; G06F 16/35; G06F 16/248; G06F 16/285; G06F 16/345; G06Q 30/0282
See application file for complete search history.

(56) References Cited

U.S. PATENT DOCUMENTS

| | | | |
|---|---|---|---|
| 8,356,030 B2 | 1/2013 | Neylon et al. | |
| 8,533,208 B2 | 9/2013 | Sundaresan et al. | |
| 8,600,796 B1 * | 12/2013 | Sterne ................ | G06Q 30/0203 705/7.33 |

(Continued)

OTHER PUBLICATIONS

Unknown, "A NLP Approach to Mining Online Reviews using Topic Modeling", Analytics Vidhya, https://www.analyticsvidhya.com/blog/2018/10/mining-online-reviews-topic-modeling-lda/, captured Mar. 25, 2019, pp. 1-23.

*Primary Examiner* — Alex Olshannikov

(57) ABSTRACT

A disclosed sentiment topic modeling tool identifies issues within voluminous customer review data, based on particular categories of review submission (e.g., particular products and experiences) and concern areas (e.g., quality, performance, suitability of features), and abstracts the extracted topic data into a manageable set of focus areas for business operations improvements. An exemplary process includes: receiving a plurality of reviews; selecting a category of review to use for a topic network; selecting a number of topics for generating the topic network; generating, based at least on the selected category and the selected number of topics, the topic network; generating a plurality of topic networks in a topic network group, and determining a set of themes for the group. Additional network groups are generated, and a set of themes is determined for each. A set of focus areas is determined, based at least on the sets, and reports are generated.

20 Claims, 6 Drawing Sheets

(56) References Cited

U.S. PATENT DOCUMENTS

| | | |
|---|---|---|
| 8,930,366 B2 | 1/2015 | Rappoport et al. |
| 10,042,923 B2 | 8/2018 | Markman et al. |
| 10,255,283 B1 * | 4/2019 | Cheng ................... G06F 16/93 |
| 10,410,224 B1 * | 9/2019 | Levanon ................ G06Q 30/02 |
| 2013/0268534 A1 | 10/2013 | Mathew et al. |
| 2015/0161686 A1 * | 6/2015 | Williams ........... G06Q 30/0282 |
| | | 705/347 |
| 2015/0220580 A1 * | 8/2015 | Pitsos .................... G06F 16/35 |
| | | 707/690 |
| 2015/0286627 A1 | 10/2015 | Chang et al. |
| 2019/0361987 A1 * | 11/2019 | Qiao .................... G06F 16/345 |

* cited by examiner

SENTIMENT TOPIC MODEL

BACKGROUND

Customer reviews of retail and e-commerce organizations' product offerings present a rich source of feedback that can be leveraged to focus product lime improvement efforts, such as increasing quality and tailoring features. Unfortunately, in large-scale operations, the customer reviews can be so voluminous that human study and assessment of each individual review may be prohibitively burdensome or overwhelming. Therefore, a tool is needed that can identify important issues contained within the available material.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A disclosed sentiment topic modeling tool identifies issues within voluminous customer review data, based on particular categories of review submission (e.g., particular products and experiences) and concern areas (e.g., quality, performance, suitability of features), and abstracts the extracted topic data into a manageable set of focus areas for business operations improvements. An exemplary process includes: receiving a plurality of reviews; selecting a category of review to use for a topic network; selecting a number of topics for generating the topic network; generating, based at least on the selected category of review and the selected number of topics, the topic network; generating a plurality of topic networks in a topic network group, and determining a set of themes for the group. Additional network groups are generated, and a set of themes is determined for each. A set of focus areas is determined, based at least on the sets, and reports are generated.

BRIEF DESCRIPTION OF THE DRAWINGS

The disclosed examples are described in detail below with reference to the accompanying drawing figures listed below.

Figure 1:
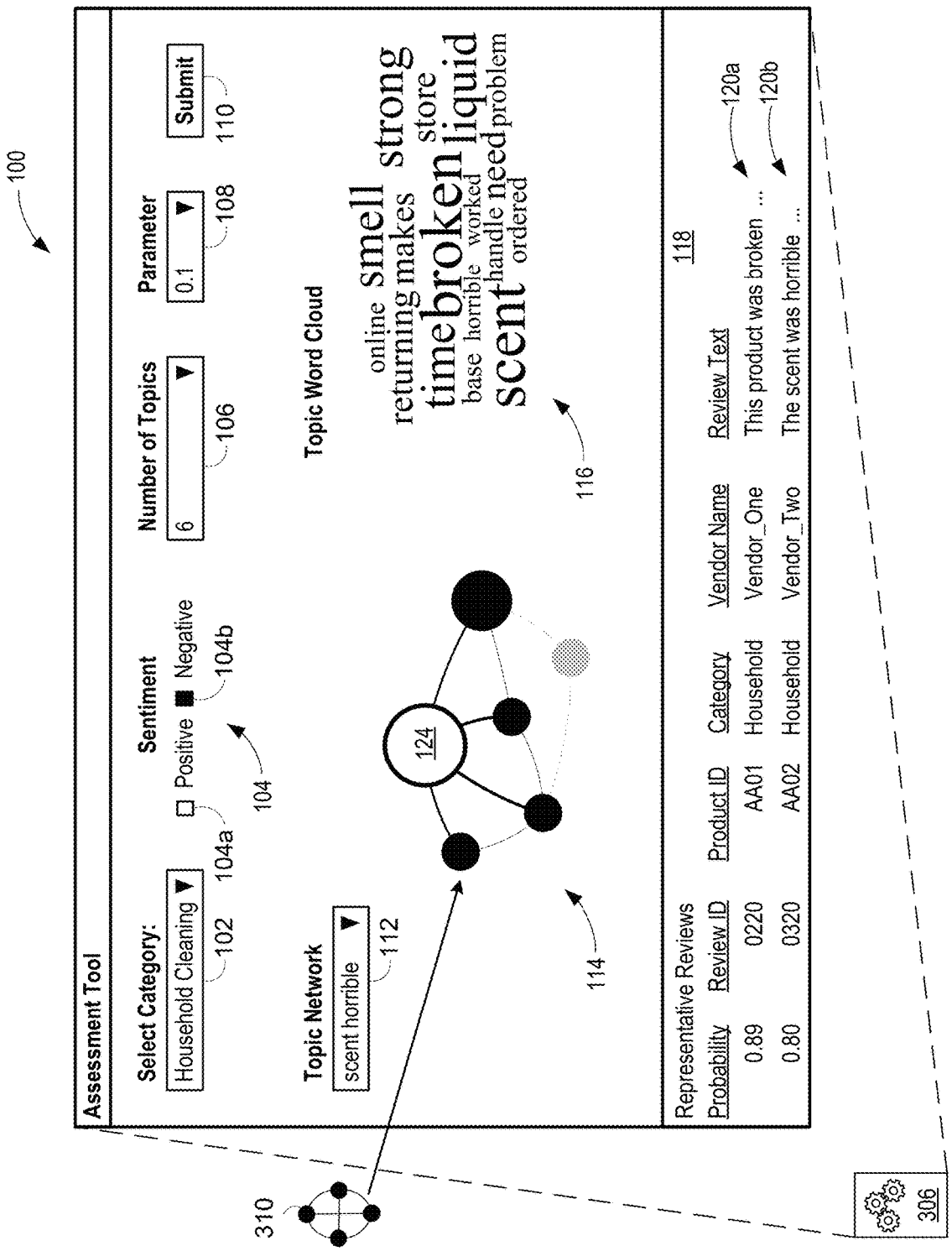
FIG. 1 illustrates an exemplary graphical user interface (GUI) for a sentiment topic model tool.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseum.

Customer reviews of retail and e-commerce organizations' product offerings present a rich source of feedback that can be leveraged to focus product lime improvement efforts, such as increasing quality and tailoring features. Unfortunately, in large-scale operations, the customer reviews can be so voluminous that human study and assessment of each individual review may be prohibitively burdensome or overwhelming. Therefore, a tool is needed that can identify important issues contained within the available material.

A disclosed sentiment topic modeling tool identifies issues within voluminous customer review data, based on particular categories of review submission (e.g., particular products and experiences) and concern areas (e.g., quality, performance, suitability of features), and abstracts the extracted topic data into a manageable set of focus areas for business operations improvements. An exemplary process includes: receiving a plurality of reviews; selecting a category of review to use for a topic network; selecting a number of topics for generating the topic network; generating, based at least on the selected category of review and the selected number of topics, the topic network; generating a plurality of topic networks in a topic network group, and determining a set of themes for the group. Additional network groups are generated, and a set of themes is determined for each. A set of focus areas is determined, based at least on the sets, and reports are generated.

Topic modeling is a process that automatically identifies topics that are present within text objects and are useful for document clustering and information extraction from unstructured text. Topic modeling can be applied to large numbers of product reviews to extract important words from the reviews. The words are the topics that assist with ascertaining how customers perceive the reviewed products, services, and experiences. The disclosed sentiment topic modeling tool extracts a category and sentiment from customer reviews of a product or service and performs text cleaning for stop-word enrichment. Examples of the tool classify the reviews as positive or negative reviews using annotations and generate a topic network and a topic word cloud using bi-grams. Additionally, review contributions are calculated for each topic and each contributing review is associated with the topic for retrieval of the contributing review when a user clicks on the topic within a graphical user interface (GUI) displaying the topic networks. This permits users to rapidly understand common issues within a voluminous set of reviews, and yet also understand which reviews contribute to extracted issues by displaying actual contributing reviews and a word cloud. The extracted information is abstracted upwardly, such as to categories (e.g., products, services, and experience) and concern areas (e.g., quality, performance, and feature set) and then to focus areas.

FIG. 1 illustrates an exemplary GUI 100 for displaying inputs to a sentiment topic model tool 306 (described in additional detail in relation to FIG. 3) and at least a portion of the output results. In some examples, GUI 100 is generated with computer-executable instructions on a computing node 700 (see FIG. 7), that includes a processor 714 and a memory 712 (a computer-readable medium) storing instructions that are operative when executed by processor 714 to perform at least a portion of the operations described for sentiment topic model tool 306 and to display GUI 100. A user can draw upon a plurality of reviews received from customers. A category selection edit box 102 takes user input to enable sentiment topic model tool 306 to select a category of review to use for a topic network 310 (also described in additional detail in relation to FIG. 3). A sentiment radio button control 104 takes user input to enable sentiment topic model tool 306 to select a sentiment for generating topic network 310. Two sentiments are shown: Positive, selected with a radio button 104a, and Negative, selected with a radio button 104b. In the illustrated example, Negative is selected.

A topic number selection edit box 106 takes user input to enable sentiment topic model tool 306 to select a number of topics for generating topic network 310. The insight value provided by a topic network can heavily depend on selecting the proper number of topics. Additional detail regarding selection of the number of topics is provided in the description of FIG. 5. A parameter selection edit box 108 takes user input to enable sentiment topic model tool 306 to select at least one parameter for generating topic network 310. A selectable parameter can be, for example, a minimum correlation value to use as a threshold for including a particular review in a generated topic network. A user clicking on a submit button 110 triggers generation of topic network 310. Sentiment topic model tool 306 is operable to generate topic network 310 based at least on the selected category of review and the selected number of topics. In some examples, sentiment topic model tool 306 is operable to generate topic network 310 based at least on the selected category of review, the selected sentiment, and the selected number of topics. In some examples, sentiment topic model tool 306 is operable to generate topic network 310 based at least on the selected category of review, the selected sentiment, the selected number of topics, and the selected parameter.

Beyond topic network 310, sentiment topic model tool 306 is operable to generate a plurality of topic network groups, each of which includes a plurality of topic networks. So in addition to topic network 310, other topic networks can be displayed. A topic network selection edit box 112 takes user input to enable sentiment topic model tool 306 to select, from among a plurality of topic networks, a selected topic network to display as a two-dimensional (2D) set of connected nodes. In the illustrated example, topic network 310 is selected, and therefore a topic network display 114 represents topic network 310. Thus, GUI 100 is operable to display the selected topic network (in this example, topic network 310 represented by topic network display 114). GUI 100 permits a user to click on a particular tip, so that sentiment topic model tool 306 selects a topic in the displayed selected topic network. As illustrated a selected topic 124 is highlighted. Sentiment topic model tool 306 then generates a word cloud 624 (see FIG. 6) for selected topic 124 in topic network 310. In some examples, sentiment topic model tool 306 also generates a word cloud for each topic 124 in topic network 310. In some examples, sentiment topic model tool 306 also determines review contributions to topic network 310. A review contribution is the probability that a particular review contributed to a particular network topic. Review contributions are unique to a particular combination of a review and a topic network.

Word cloud 624 is displayed as word cloud display 116 on GUI 100, and representative reviews are shown in a review display window 118. Two representative views 120a and 120b are illustrated, although it should be understood that the number of displayed representative reviews can vary widely. Review contributions are shown under the column titled as Probability.

Figure 2:
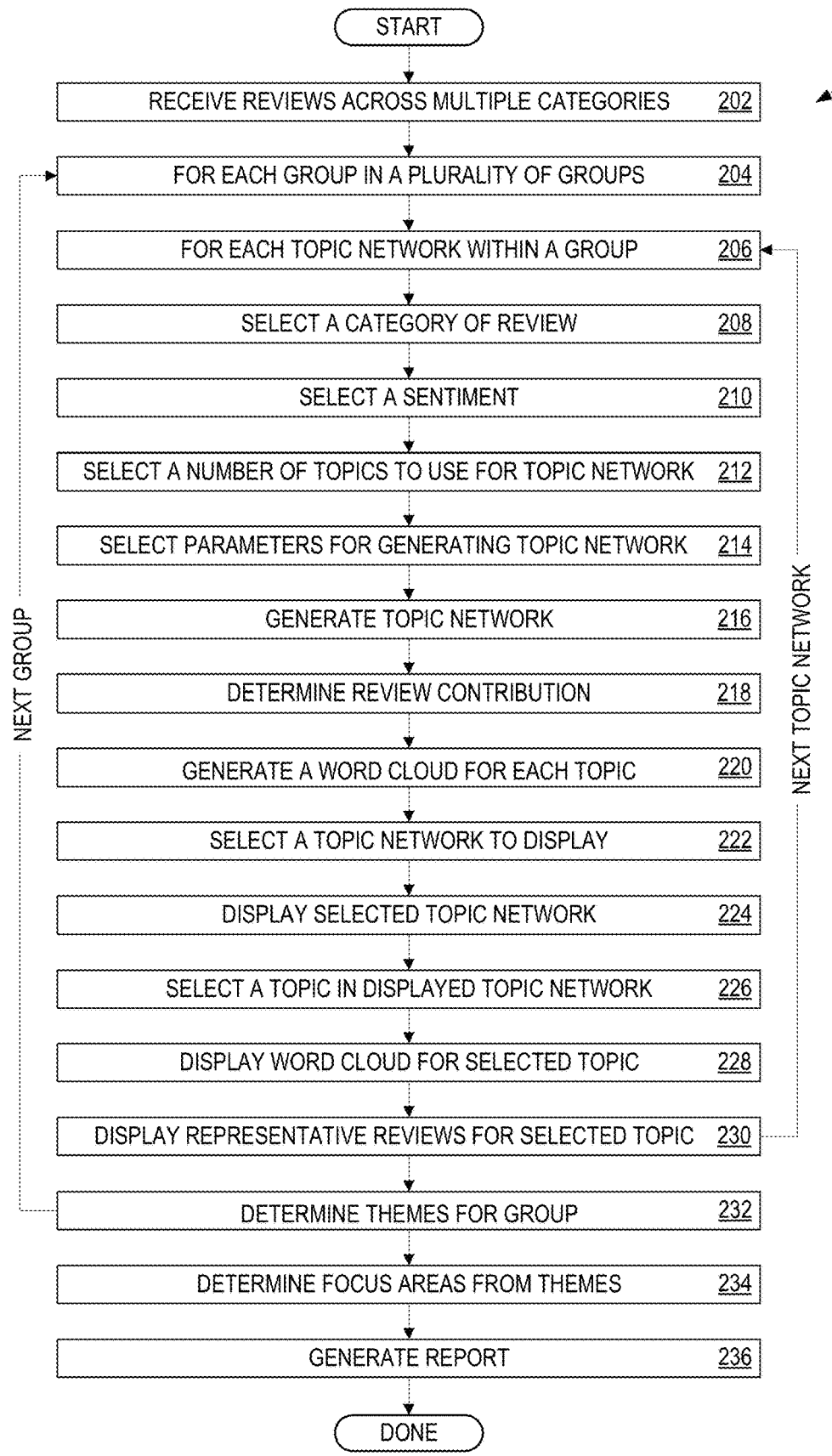
FIG. 2 shows a flow chart of exemplary operations associated with the sentiment topic model tool.

FIG. 2 shows a flow chart 200 of exemplary operations associated with sentiment topic model tool 306. In some examples, some or all of flow chart 200 is performed as computer-executable instructions on computing node 700. Flow chart 200 commences with operation 202, which includes receiving a plurality of reviews, such as customer reviews for multiple products, services and experiences across multiple categories, and storing review data 302 in a data lake or a data store 304 (both shown in FIG. 3). Some examples of sentiment topic model tool 306 can be used with GUI 100 (of FIG. 1) to permit a user to manually create topic networks one at a time, or to generate multiple topic networks in a bath operation, such as controlled by a script or another tool. Thus, sentiment topic model tool 306 is operable to generate a plurality of topic networks assigned to a plurality of topic network groups. Operations 204 and 206 control the multiple cycles through operations 208 through 232.

Operation 208 includes selecting a category of review to use for a topic network. This can be accomplished through GUI 100 and/or a script that automates at least some of the user activities described above for GUI 100. For the initial description of operations 208 through 230, the first topic network example will be topic network 310. It should be understood that, during subsequent passes through operations 208 through 230, the activities and processing described for topic network 310 can apply to other topic networks. Operation 210 includes selecting a sentiment for generating topic network 310, operation 212 includes selecting a number of topics for generating topic network 310, and operation 214 includes selecting at least one parameter for generating topic network 310. Operation 216 includes generating, based at least on the selected category of review, the selected sentiment, the selected number of topics, and the selected parameter, topic network 310. In some examples, operation 216 does not use at least one of a sentiment and a parameter. In some examples, operation 216 is triggered by a user clicking on submit button 110 in GUI 100. In some examples, operation 216 is triggered by other trigger criteria, such as a schedule. Operation 218 includes determining review contributions for topic network 310, and operation 220 includes generating a word cloud (e.g., word cloud 624) for each topic in topic network 310.

Operation 222 includes selecting, from among a plurality of topic networks, a selected topic network to display (whether topic network 310 or a different topic network). Operation 224 includes displaying the selected topic network, for example, in GUI 100. Operation 226 includes selecting a topic in the displayed selected topic network. Operation 228 includes displaying a word cloud for the selected topic, and operation 230 includes displaying representative reviews for the selected topic. If additional topic networks are to be generated for the current topic network group, flow chart 2000 returns to operation 206. Otherwise, operation 232 includes determining, for the current topic network group, a set of themes. In some examples, identifying (or determining) themes or concerns is accomplished according to business operation units or departments. For example, for a retail department focusing on household supplies, a group of topic networks can be clustered on cleaning supplies and/or other household goods. Exemplary concern areas include quality of products, suitability of products for their advertised purpose, and features that are either missing or superfluous. If additional topic network groups are to be created, flow chart 200 returns to operation 204. Multiple passes through operation 232 results in determining, for each of the topic network groups, a set of themes to produce a plurality of theme sets.

Operation 234 includes determining, based at least on the plurality of theme sets, a set of focus areas for business operations improvements. This is a layer of abstraction above the immediate output of the generated topic networks. Operation 236 includes generating one or more reports. Example reports include a set of themes for a particular topic network and a set of focus areas. That is, reports can be generated at multiple layers of abstraction of the data and analysis.

Figure 3:
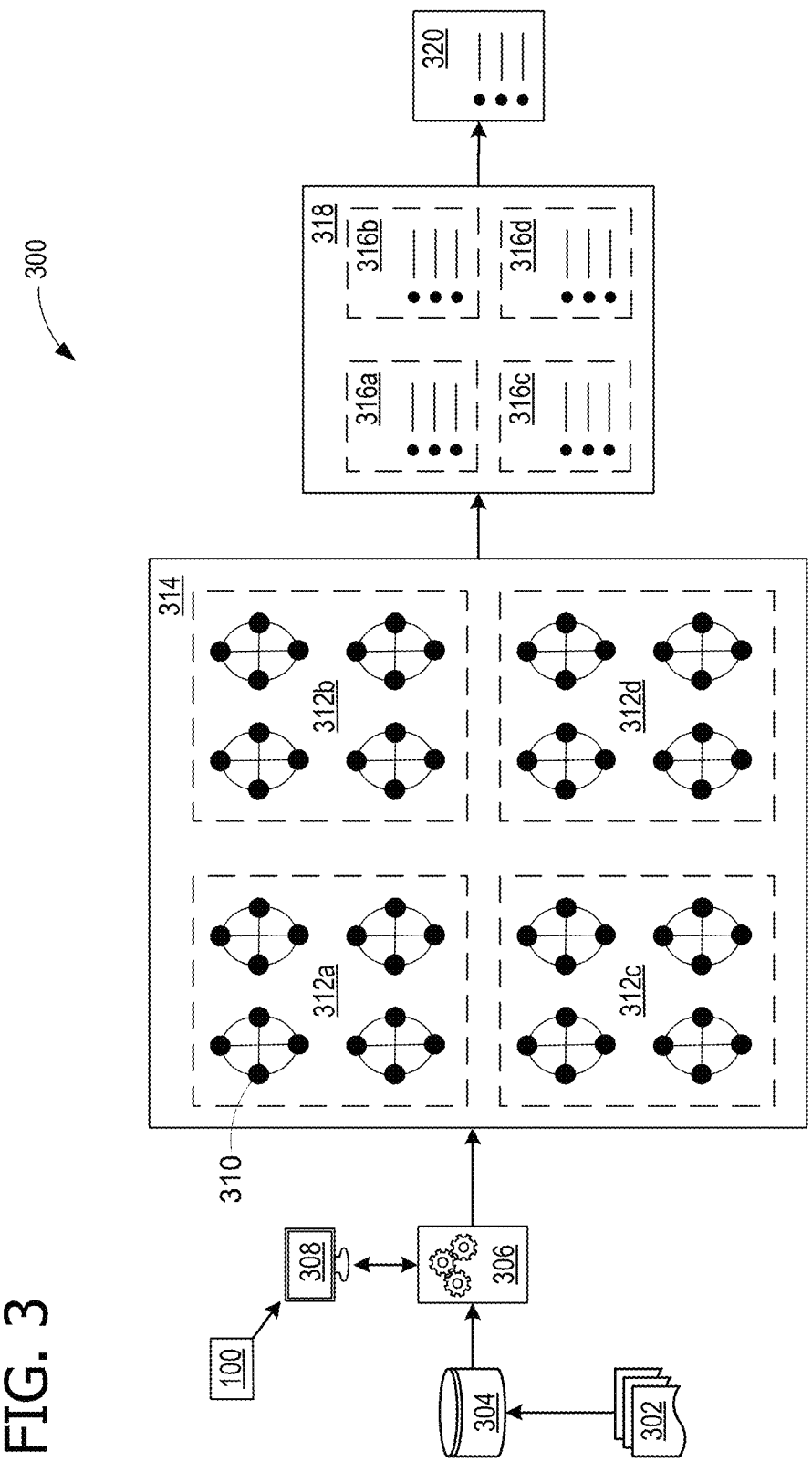
FIG. 3 illustrates the generation of various data sets by the sentiment topic model tool.

FIG. 3 illustrates the generation of various data sets 300 by sentiment topic model tool 306. A plurality of reviews (review data 302) is stored in data store 304 and the retrieved by (received by) sentiment topic model tool 306. As illustrated, GUI 100 is displayed on a user interface component 308. In some examples, user interface component 308 is a portion of a presentation component 716 of a computing node 700 (see FIG. 7) that both executes sentiment topic model tool 306 and displays GUI 100. In some examples, sentiment topic model tool 306 and GUI 100 or execute on separate computing nodes.

As illustrated, topic network 310 is one of the topic networks within a first topic network group 312a. Sentiment topic model tool 306 has also generated additional topic network groups 312b, 312c, and 312d. Together, topic network groups 312a-312d form a plurality of topic network groups 314. A set of themes 316a has been determined for topic network group 312a, and additional theme sets 316b, 316c, and 316d have been generated for topic network groups 312b, 312c, and 312d, respectively. Together, theme sets 316a-316d from a plurality of theme sets 318. A set of focus areas 320 is extracted from plurality of theme sets 318. Thus, sentiment topic model tool 306 has determined, based at least on plurality of theme sets 318, set of focus areas 320.

Figure 4:
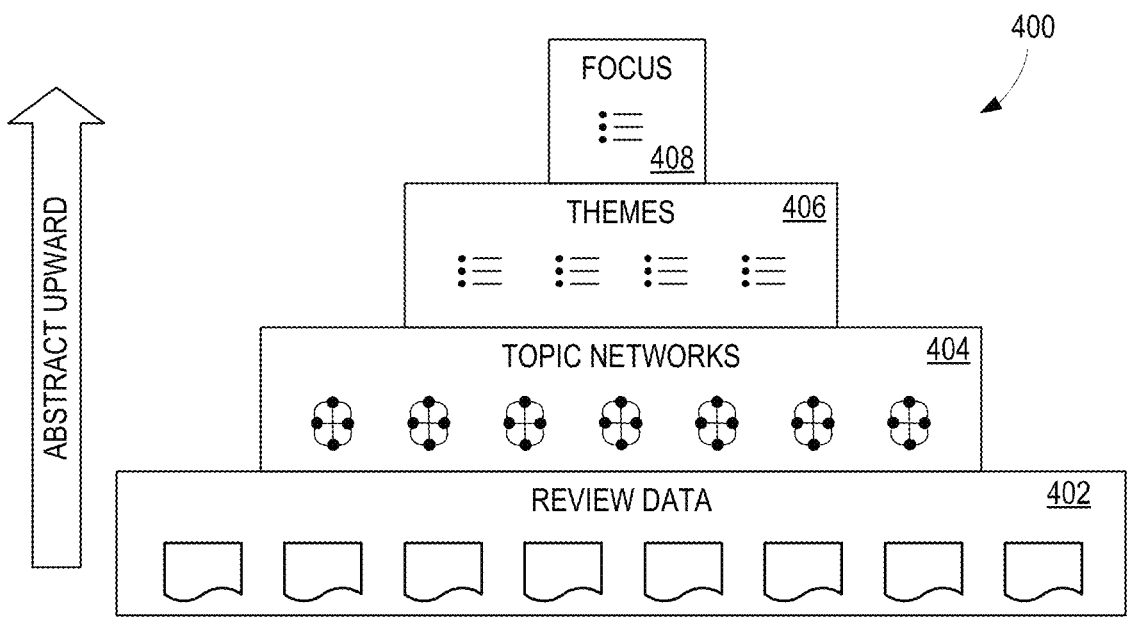
FIG. 4 illustrates an notional data abstraction model for the various data sets illustrated in FIG. 3.

FIG. 4 illustrates a notional data abstraction model 400 for the various data sets 300 illustrated in FIG. 3. A review data layer 402 corresponds to review data 302. A topic networks layer 404 is extracted from review data layer 402 and corresponds to plurality of topic network groups 314. A themes layer 406 is extracted from topic networks layer 404 and corresponds to plurality of theme sets 318. A focus layer 40b is extracted from themes layer 406 and corresponds to focus areas 320.

Figure 5:
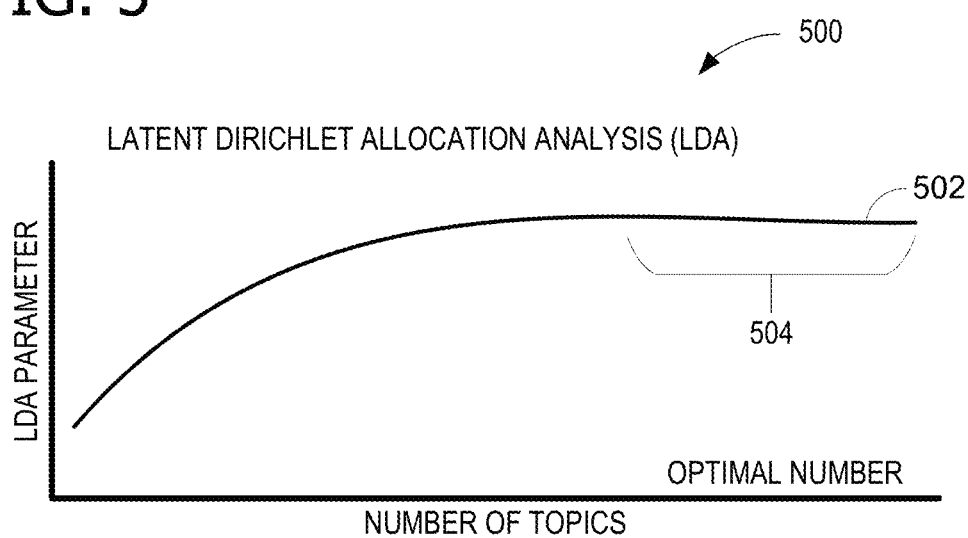
FIG. 5 is a plot of an exemplary mathematical relationship used by the sentiment topic model tool.

FIG. 5 is a plot 500 of an exemplary Latent Dirichlet Allocation (LDA) curve 502. Some examples of sentiment topic model tool 306 use an LDA. (See FIG. 6) An LDA is a generative statistical model that allows sets of observations to be explained by unobserved groups that explain why some parts of the data are similar. For example, observations are words collected into various customer reviews, each customer review is a mixture of a small number of topics, and so the presence of certain words is attributable to one of the review's topics. An LDA is thus a rudimentary example of a topic model. As mentioned previously, the number of topics used to build a topic network from a set of documents (e.g., customer reviews) can influence the quality and usefulness of a topic model. Curve 502 shows a stable area 504 which indicates an optimal number of topics to use when constructing a topic model for a particular set of documents.

As an example, a set of customer reviews for coffee uses seven topics with ten words each for a positive sentiment topic network, and four topics with ten words each for a negative sentiment topic. For the positive sentiment topic network, the ten words for one of the topics are: good, price, buy, bean, roast, size, dark, fresh, little, and medium. For the negative sentiment topic network, the ten words for one of the topics are: taste, drink, first, worst, bitter, sip, fill, particular, beverage, and body.

Figure 6:
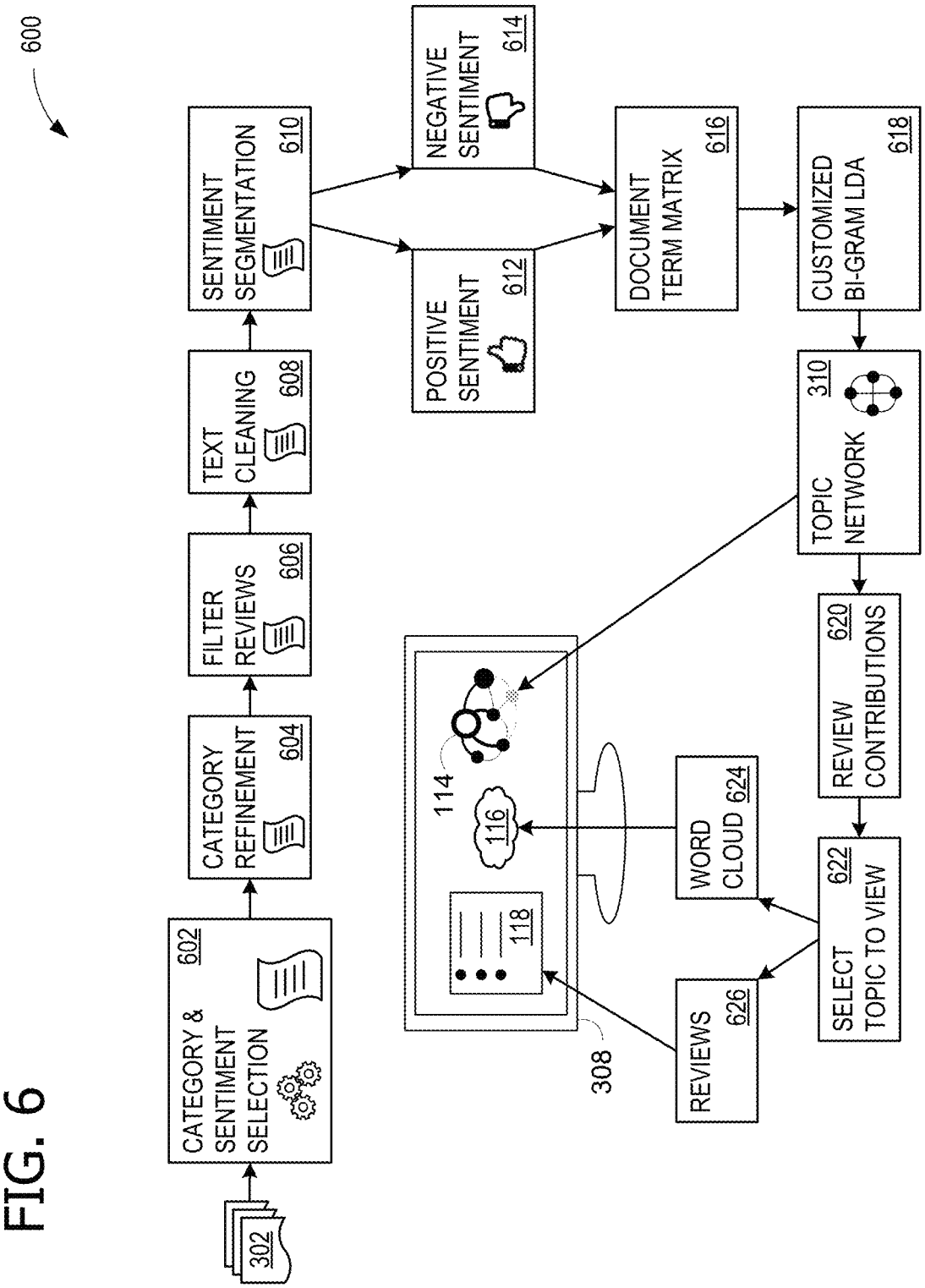
FIG. 6 illustrates an exemplary process flow, leveraging the mathematical relationship shown in FIG. 5 to produce the various data sets shown in FIG. 3 and the GUI display shown in FIG. 1.

FIG. 6 illustrates an exemplary process flow 600, leveraging the mathematical relationship shown in FIG. 5 to produce the various data sets shown in FIG. 3 and GUI 100 shown in FIG. 1. Process flow 600 is a high-level modular illustration of activities associated with sentiment topic model tool 306. Review data 302 is ingested and operation 602 includes category and sentiment selection, either manually (using GUI 100 of FIG. 100) or using a script to automate the process. Categories and sentiment are extracted from customer review of products, services, and experiences. Category refinement, in operation 604, identifies categories having enough reviews, identified as belonging to that category, to generate a meaningful topic network for analysis. In some examples, categories can be adjusted to include reviews that would otherwise be excluded. Reviews are filtered in operation 606, to remove certain words and artifacts that have been shown to not be helpful in generating topic networks, such as certain nouns.

Text cleaning, in operation 608 removes stopwords, punctuation, and some other characters, such as numbers. Stopwords are words that do not provide much useful information for assigning text to a category. Stopwords include prepositions and conjunctions. The aim is to increase the relative frequency of relevant terms by removing terms that provide little meaning, but yet may occur more frequently. Operation 610 includes sentiment segmentation. In some examples, a script is used to classify reviews them into positive sentiment reviews 612 and negative sentiment reviews 614. Operation 616 leverages a document term matrix (DTM) for lemmatization. Lemmatization groups inflected forms of a word so that they can be analyzed as a single item, identified by the word's lemma, or dictionary form. In some examples, lemmatization includes tokenization, which uses a token to represent the lemmatized words. In some examples, the DTM is also leveraged to identify concern areas for theme sets 316a-316d (of FIG. 3) and for defining categories.

Operation 618 uses a customized bi-gram LDA to generate topic network 310. A bi-gram is a sequence of two adjacent elements from a string of tokens, which are typically letters, syllables, or words. Bi-grams are utilized to identify words that occur together and form topics. Relationships between topics are found in order to then generate word cloud 624. In some examples, operation 618 leverages a machine learning (ML) or artificial intelligence (AL) model to build topic network 310 with the LDA. Topic network 310 is displayed on user interface component 308 as topic network display 114. Review contributions are identified in operation 620 and operation 622 selects a topic to view in GUI 100. This selection of a particular topic enables identification of the specific word cloud 624 to display as word cloud display 116 on user interface component 308, and also the specific relevant reviews 626 (e.g., representative views 120a and 120b) to display in review display window 118. In some examples, a version of word cloud 624 is generated for every topic within topic network 310, prior to a user selecting a particular topic to display in operation 622.

Exemplary Operating Environment

Figure 7:
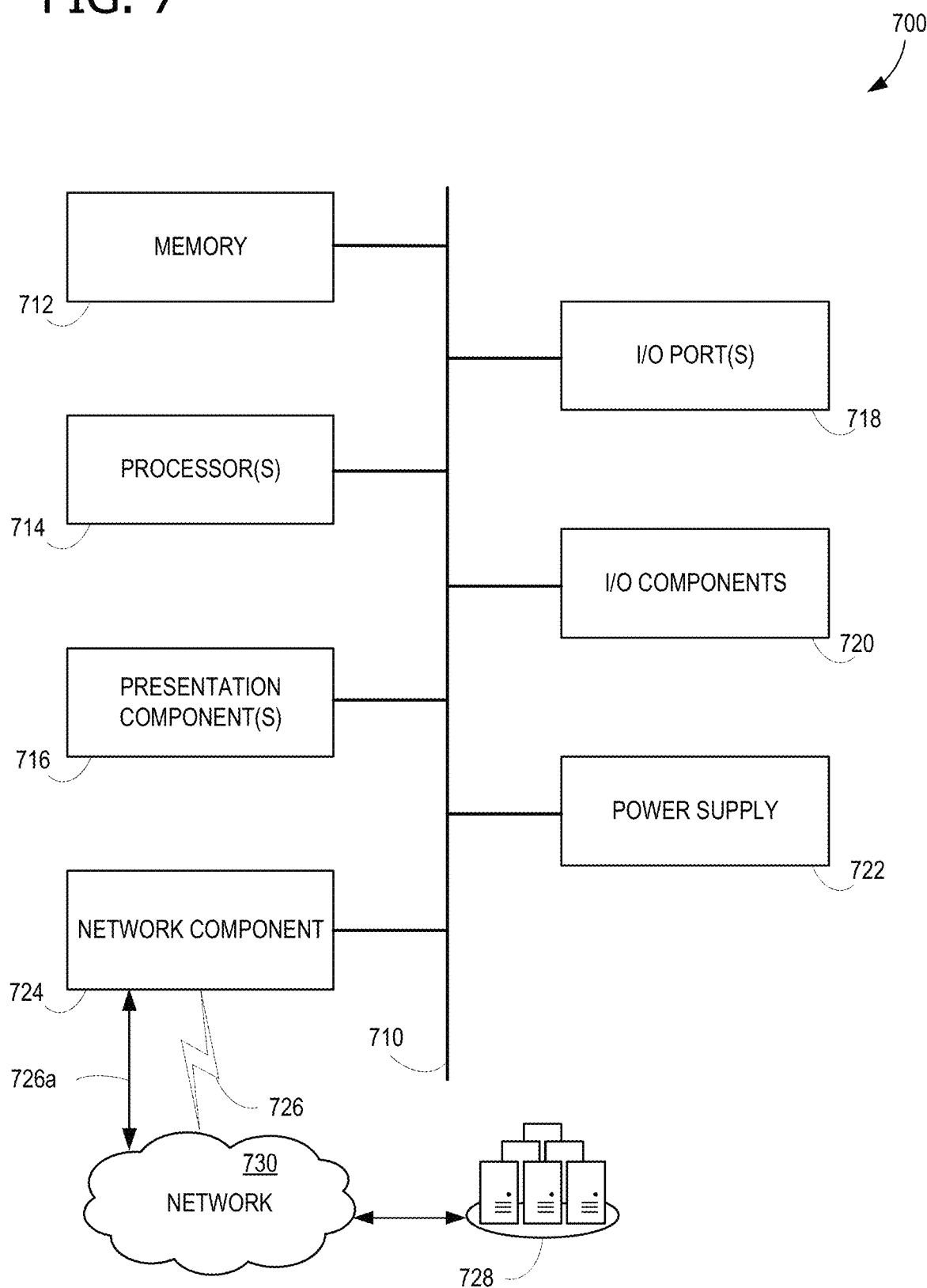
FIG. 7 is a block diagram of an example computing node for implementing aspects disclosed herein.

FIG. 7 is a block diagram of an example computing node 700 for implementing aspects disclosed herein and is designated generally as computing node 700. Computing node 700 is one example of a suitable computing environment and is not intended to suggest any limitation as to the scope of use or functionality of the invention. Neither should the computing node 700 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 730.

Computing node 700 includes a bus 710 that directly or indirectly couples the following devices: memory 712, one or more processors 714, one or more presentation components 716, input/output (I/O) ports 718, I/O components 720, a power supply 722, and a network component 724. Computing node 700 should not be interpreted as having any dependency or requirement related to any single component or combination of components illustrated therein. While computing node 700 is depicted as a seemingly single device, multiple computing nodes 700 can work together and share the depicted device resources. That is, one or more computer storage devices having computer-executable instructions stored thereon may perform operations disclosed herein. For example, memory 712 can be distributed across multiple devices, processor(s) 714 can provide housed on different devices, and so on.

Bus 710 represents what can be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. Such is the nature of the art, and the diagram of FIG. 7 is merely illustrative of an exemplary computing node that can be used in connection with one or more embodiments. Distinction is not made between such categories as "workstation," "server," "laptop," "hand-held device," etc., as all are contemplated within the scope of FIG. 7 and the references herein to a "computing node" or a "computing device." Memory 712 can include any of the computer-readable media discussed herein. Memory 712 can be used to store and access instructions configured to carry out the various operations disclosed herein. In some examples, memory 712 includes computer storage media in the form of volatile and/or nonvolatile memory, removable or non-removable memory, data disks in virtual environments, or a combination thereof.

Processor(s) 714 can include any quantity of processing units that read data from various entities, such as memory 712 or I/O components 720. Specifically, processor(s) 714 are programmed to execute computer-executable instructions for implementing aspects of the disclosure. The instructions can be performed by the processor, by multiple processors within the computing node 700, or by a processor external to the client computing node 700. In some examples, the processor(s) 714 are programmed to execute instructions such as those illustrated in the flowcharts discussed below and depicted in the accompanying drawings. Moreover, in some examples, the processor(s) 714 represent an implementation of analog techniques to perform the operations described herein. For example, the operations can be performed by an analog client computing node 700 and/or a digital client computing node 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 700, across a wired connection, or in other ways. Ports 718 allow computing node 700 to be logically coupled to other devices including I/O components 720, some of which may be built in. Example I/O components 720 include, for example but without limitation, a microphone, keyboard, mouse, joystick, game pad, satellite dish, scanner, printer, wireless device, etc.

In some examples, the network component 724 includes a network interface card and/or computer-executable instructions (e.g., a driver) for operating the network interface card. Communication between the computing node 700 and other devices may occur using any protocol or mechanism over any wired or wireless connection. In some examples, the network component 724 is operable to communicate data over public, private, or hybrid (public and private) network 730 using a transfer protocol, between devices wirelessly using short range communication technologies (e.g., near-field communication (NFC), Bluetooth® branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing node 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for sentiment topic modeling comprises: a processor; and a computer-readable medium storing instructions that are operative when executed by the processor to: receive a plurality of reviews; select a category of review to use for a first topic network; select a number of topics for generating the first topic network; generate, based at least on the selected category of review and the selected number of topics, the first topic network; generate a first plurality of topic networks in a first topic network group, wherein the first topic network group includes the first topic network; determine a first set of themes for the first topic network group; and generate a report of the first set of themes.

An exemplary method of sentiment topic modeling comprises: receiving a plurality of reviews; selecting a category of review to use for a first topic network; selecting a number of topics for generating the first topic network; generating, based at least on the selected category of review and the selected number of topics, the first topic network; generating a first plurality of topic networks in a first topic network group, wherein the first topic network group includes the first topic network; determining a first set of themes for the first topic network group; and generating a report of the first set of themes.

An exemplary computer storage device has computer-executable instructions stored thereon for sentiment topic modeling, which, on execution by a computer, cause the computer to perform operations comprising: receiving a plurality of reviews; selecting a category of review to use for a first topic network; selecting a sentiment for generating the first topic network; selecting a number of topics for generating the first topic network; selecting at least one parameter for generating the first topic network; generating, based at least on the selected category of review, the selected sentiment, the selected number of topics, and the selected parameter, the first topic network; generating a word cloud for each topic in the first topic network; determining review contributions for the first topic network; generating a first plurality of topic networks in a first topic network group, wherein the first topic network group includes the first topic network; determining a first set of themes for the first topic network group; generating a plurality of topic network groups, wherein the plurality of topic network groups includes the first topic network group, and wherein each of the topic network groups comprises a plurality of topic networks; determining, for each of the topic network groups, a set of themes to produce a plurality of theme sets; determining, based at least on the plurality of theme sets, a set of focus areas; and generating a report of a set of themes of the plurality of theme sets or the set of focus areas.

Alternatively, or in addition to the other examples described herein, examples include any combination of the following:

generating a word cloud for at least one topic in the first topic network;

determining review contributions for the first topic network;

selecting a sentiment for generating the first topic network;

selecting, from among a plurality of topic networks, a selected topic network to display;

displaying the selected topic network;

selecting a topic in the displayed selected topic network;

displaying a word cloud for the selected topic;

displaying representative reviews for the selected topic; and selecting at least one parameter for generating the first topic network.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for sentiment topic modeling, the system comprising:
    a processor; and
    a computer-readable medium storing instructions that are operative when executed by the processor to:
        receive a plurality of reviews;
        select a category of review to use for a first topic network;
        select a number of topics for generating the first topic network;
        select at least one parameter for generating a plurality of topic networks including the first topic network, wherein the at least one parameter is a minimum correlation value that provides a threshold for including a review of the plurality of reviews in the generated plurality of topic networks;
        generate, based at least on the selected category of review and the selected number of topics, the first topic network;
        generate a first plurality of topic networks in a first topic network group, wherein the first topic network group includes the first topic network;
        determine concern areas raised for the first topic network group, wherein the concern areas are raised in the received plurality of reviews and include at least one of quality, performance, or a feature set;
        determine, based on the determined concern areas raised for the first topic network group, a focus area for business operations improvements; and
        generate a report of the focus area addressing the concern areas.

2. The system of claim 1 wherein the instructions are further operative to:
    generate a plurality of topic network groups, wherein the plurality of topic network groups includes the first topic network group, and wherein each of the topic network groups comprises the plurality of topic networks;
    determine, for each of the topic network groups, a set of themes to produce a plurality of theme sets;
    determine, based at least on the plurality of theme sets, a set of the focus areas; and
    generate a report of the set of the focus areas.

3. The system of claim 1 wherein the instructions are further operative to:
    generate a word cloud for at least one topic in the first topic network.

4. The system of claim 1 wherein the instructions are further operative to:
    determine one or more review contributions for the first topic network, wherein the review contribution is a probability that a particular review of the plurality of reviews contributed to the first topic network.

5. The system of claim 1 wherein the instructions are further operative to:
    select a sentiment for generating the first topic network.

6. The system of claim 1 wherein the instructions are further operative to:
    select, from among a plurality of topic networks, a selected topic network to display; and
    display the selected topic network.

7. The system of claim 6 wherein the instructions are further operative to:
    select a topic in the displayed selected topic network; and
    display a word cloud for the selected topic.

8. The system of claim 7 wherein the instructions are further operative to:
    display representative reviews for the selected topic.

9. The system of claim 1 wherein the instructions are further operative to:
    select the at least one parameter for generating the plurality of topic networks including the first topic network responsive to receiving a user input via a parameter selection box accessed via a graphic user interface (GUI).

10. A method of sentiment topic modeling, the method comprising:
    receiving a plurality of reviews;
    selecting a category of review to use for a first topic network;
    selecting a number of topics for generating the first topic network;
    selecting at least one parameter for generating a plurality of topic networks including the first topic network, wherein the at least one parameter is a minimum correlation value that provides a threshold for including a review of the plurality of reviews in the generated plurality of topic networks;
    generating, based at least on the selected category of review and the selected number of topics, the first topic network;
    generating a first plurality of topic networks in a first topic network group, wherein the first topic network group includes the first topic network;
        determining concern areas raised for the first topic network group, wherein the concern areas are raised in the received plurality of reviews and include at least one of quality, performance, or a feature set;

determine, based on the determined concern areas raised for the first topic network group, a focus area for business operations improvements; and generating a report of the focus area addressing the concern areas.

11. The method of claim 10 further comprising:

generating a plurality of topic network groups, wherein the plurality of topic network groups includes the first topic network group, and wherein each of the topic network groups comprises the plurality of topic networks;

determining, for each of the topic network groups, a set of themes to produce a plurality of theme sets;

determining, based at least on the plurality of theme sets, a set of the focus areas; and generating a report of the set of the focus areas.

12. The method of claim 10 further comprising:

generating a word cloud for at least one topic in the first topic network.

13. The method of claim 10 further comprising:

determining review contributions for the first topic network.

14. The method of claim 10 further comprising:

selecting a sentiment for generating the first topic network.

15. The method of claim 10 further comprising:

selecting, from among a plurality of topic networks, a selected topic network to display; and displaying the selected topic network.

16. The method of claim 15 further comprising:

selecting a topic in the displayed selected topic network; and displaying a word cloud for the selected topic.

17. The method of claim 16 further comprising:

displaying representative reviews for the selected topic.

18. The method of claim 10 further comprising:

selecting the at least one parameter for generating the plurality of topic networks including the first topic network responsive to receiving a user input via a parameter selection box accessed via a graphic user interface (GUI).

19. One or more non-transitory computer storage devices having computer-executable instructions stored thereon for sentiment topic modeling, which, on execution by a computer, cause the computer to perform operations comprising:

receiving a plurality of reviews;

selecting a category of review to use for a first topic network;

selecting a sentiment for generating the first topic network;

selecting a number of topics for generating the first topic network;

selecting at least one parameter for generating a plurality of topic networks including the first topic network, wherein the at least one parameter is a minimum correlation value that provides a threshold for including a review of the plurality of reviews in the generated plurality of topic networks;

generating, based at least on the selected category of review, the selected sentiment, the selected number of topics, and the selected parameter, the first topic network;

generating a word cloud for at least one topic in the first topic network;

determining review contributions for the first topic network;

generating a first plurality of topic networks in a first topic network group, wherein the first topic network group includes the first topic network;

determining a first set of themes for the first topic network group;

generating the plurality of topic network groups, wherein the plurality of topic network groups includes the first topic network group, and wherein each of the topic network groups comprises a plurality of topic networks;

determining, for each of the topic network groups, a set of themes to produce a plurality of theme sets;

determine concern areas raised for the first topic network group, wherein the concern areas are raised in the received plurality of reviews and include at least one of quality, performance, or a feature set;

determining, based on the determined concern areas raised for the first topic network group, a focus area for business operations improvements; and generating a report of the focus area addressing the concern areas.

20. The one or more non-transitory computer storage devices of claim 19 wherein the operations further comprise:

selecting, from among a plurality of topic networks, a selected topic network to display;

displaying the selected topic network;

selecting a topic in the displayed selected topic network;

displaying a word cloud for the selected topic; and displaying representative reviews for the selected topic.

* * * * *